(12) United States Patent
Furumoto et al.

(10) Patent No.: US 9,838,638 B2
(45) Date of Patent: Dec. 5, 2017

(54) RADIATION IMAGING APPARATUS, METHOD OF DRIVING THE SAME, AND RADIATION IMAGING SYSTEM

(71) Applicant: CANON KABUSHIKI KAISHA, Tokyo (JP)

(72) Inventors: Kazuya Furumoto, Tokyo (JP); Minoru Watanabe, Yokohama (JP); Keigo Yokoyama, Honjo (JP); Masato Ofuji, Takasaki (JP); Jun Kawanabe, Kawasaki (JP); Kentaro Fujiyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/366,048

(22) Filed: Dec. 1, 2016

(65) Prior Publication Data
US 2017/0201704 A1    Jul. 13, 2017

(30) Foreign Application Priority Data

Jan. 13, 2016 (JP) ................................ 2016-004613

(51) Int. Cl.
*G01J 1/42* (2006.01)
*H04N 5/378* (2011.01)
*H04N 5/235* (2006.01)
*G01T 1/16* (2006.01)

(52) U.S. Cl.
CPC ............... *H04N 5/378* (2013.01); *G01T 1/16* (2013.01); *H04N 5/2353* (2013.01)

(58) Field of Classification Search
CPC .......... G01T 1/24; G01T 1/247; G01T 1/2928
See application file for complete search history.

(56) References Cited

U.S. PATENT DOCUMENTS

| | | | |
|---|---|---|---|
| 6,399,950 B1 * | 6/2002 | Kimura | G01T 1/24 250/370.09 |
| 7,386,089 B2 | 6/2008 | Endo et al. | 378/5 |
| 7,514,663 B2 | 4/2009 | Yagi et al. | 250/208.1 |
| 7,541,591 B2 | 6/2009 | Endo et al. | 250/369 |
| 7,869,568 B2 | 1/2011 | Yokoyama et al. | 378/98.8 |
| 7,897,930 B2 | 3/2011 | Mochizuki et al. | 250/370.09 |
| 8,829,438 B2 | 9/2014 | Sato et al. | 250/336.1 |
| 9,128,368 B2 * | 9/2015 | Tajima | G03B 42/02 |

(Continued)

FOREIGN PATENT DOCUMENTS

JP    2012-015913    9/2012

*Primary Examiner* — Kiho Kim
(74) *Attorney, Agent, or Firm* — Fitzpatrick, Cella, Harper & Scinto

(57) ABSTRACT

A radiation imaging apparatus, comprising pixels, a unit including a detecting element and a switch element, a signal line connected to the detecting element through the switch element, and a controller, the controller obtains, before a start of radiation irradiation, a first signal of the signal line with the switch element being in a non-conductive state and a second signal of the signal line with the switch element being in a conductive state, obtains, in response to the start of the irradiation, a third signal of the signal line with the switch element being in the non-conductive state and a fourth signal of the signal line with the switch element being in the conductive state, and performs AEC based on the first to fourth signals.

32 Claims, 9 Drawing Sheets

(56) References Cited

U.S. PATENT DOCUMENTS

| | | | |
|---|---|---|---|
| 9,521,347 B2 | 12/2016 | Kawanabe et al. | H04N 5/378 |
| 9,625,585 B1 | 4/2017 | Yokoyama et al. | G01T 1/17 |
| 2008/0237479 A1* | 10/2008 | Iwakiri | G01T 1/2928 250/370.08 |
| 2011/0317054 A1 | 12/2011 | Kameshima et al. | 348/302 |
| 2012/0001079 A1 | 1/2012 | Okada | 250/366 |
| 2012/0132820 A1* | 5/2012 | Iwakiri | G01T 1/2018 250/370.08 |
| 2012/0140892 A1* | 6/2012 | Kondou | G01T 1/2928 378/98.8 |
| 2012/0321047 A1* | 12/2012 | Iwase | G01T 1/243 378/98.2 |
| 2013/0032696 A1* | 2/2013 | Tajima | A61B 6/42 250/208.1 |
| 2013/0341525 A1* | 12/2013 | Maruta | G01T 1/17 250/394 |
| 2014/0119509 A1* | 5/2014 | Kaneko | A61B 6/4233 378/62 |
| 2014/0124678 A1* | 5/2014 | Yoneyama | A61B 6/4283 250/393 |
| 2014/0346367 A1* | 11/2014 | Shikino | G01T 1/17 250/394 |
| 2015/0316661 A1 | 11/2015 | Fujiyoshi et al. | G01T 1/2018 |
| 2015/0362601 A1 | 12/2015 | Ofuji et al. | G01T 1/2018 |
| 2016/0025865 A1 | 1/2016 | Wayama et al. | G01T 1/026 |
| 2016/0047920 A1 | 2/2016 | Yokoyama et al. | G01T 1/247 |
| 2016/0074001 A1* | 3/2016 | Matsushita | A61B 6/566 378/62 |

\* cited by examiner

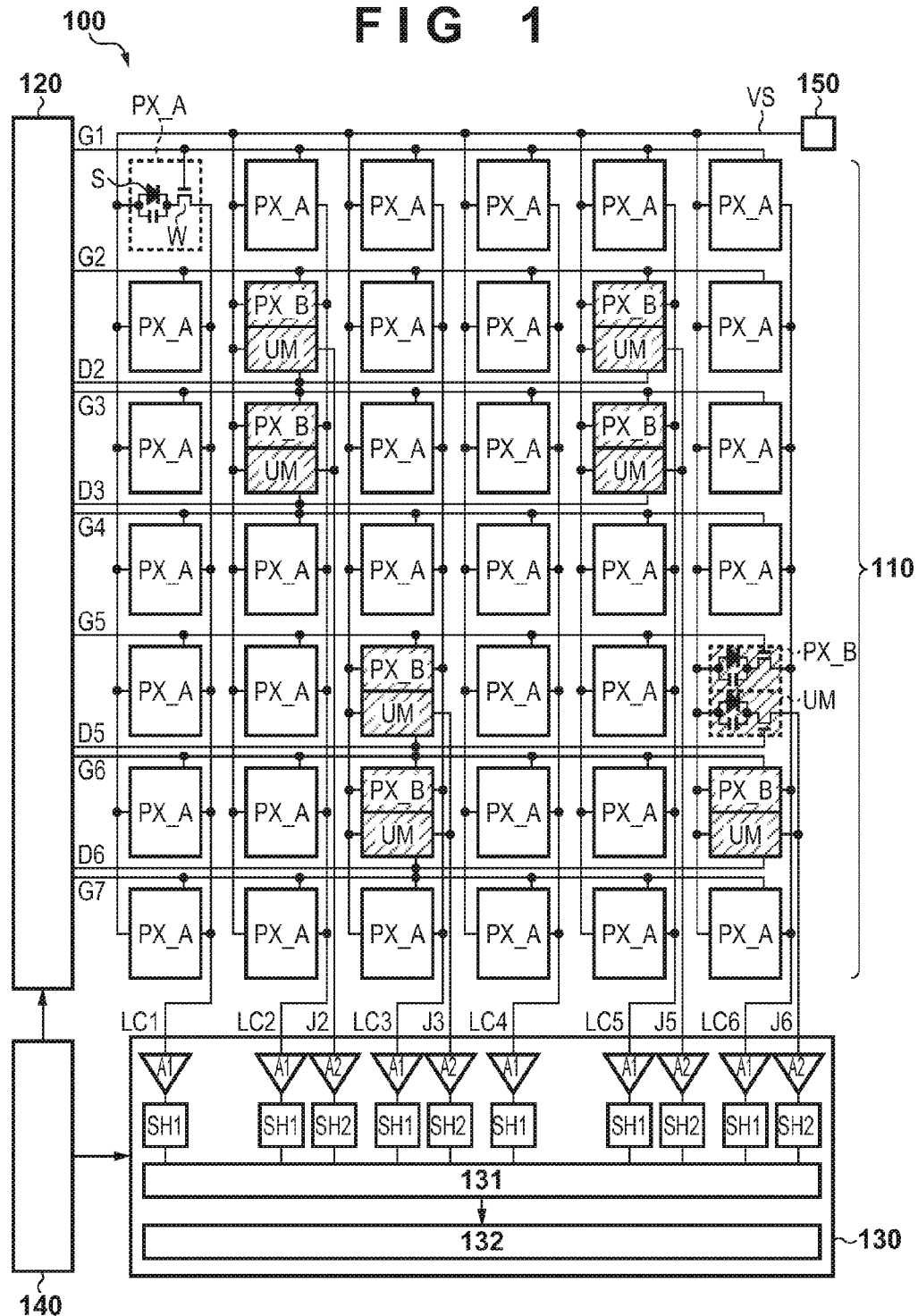

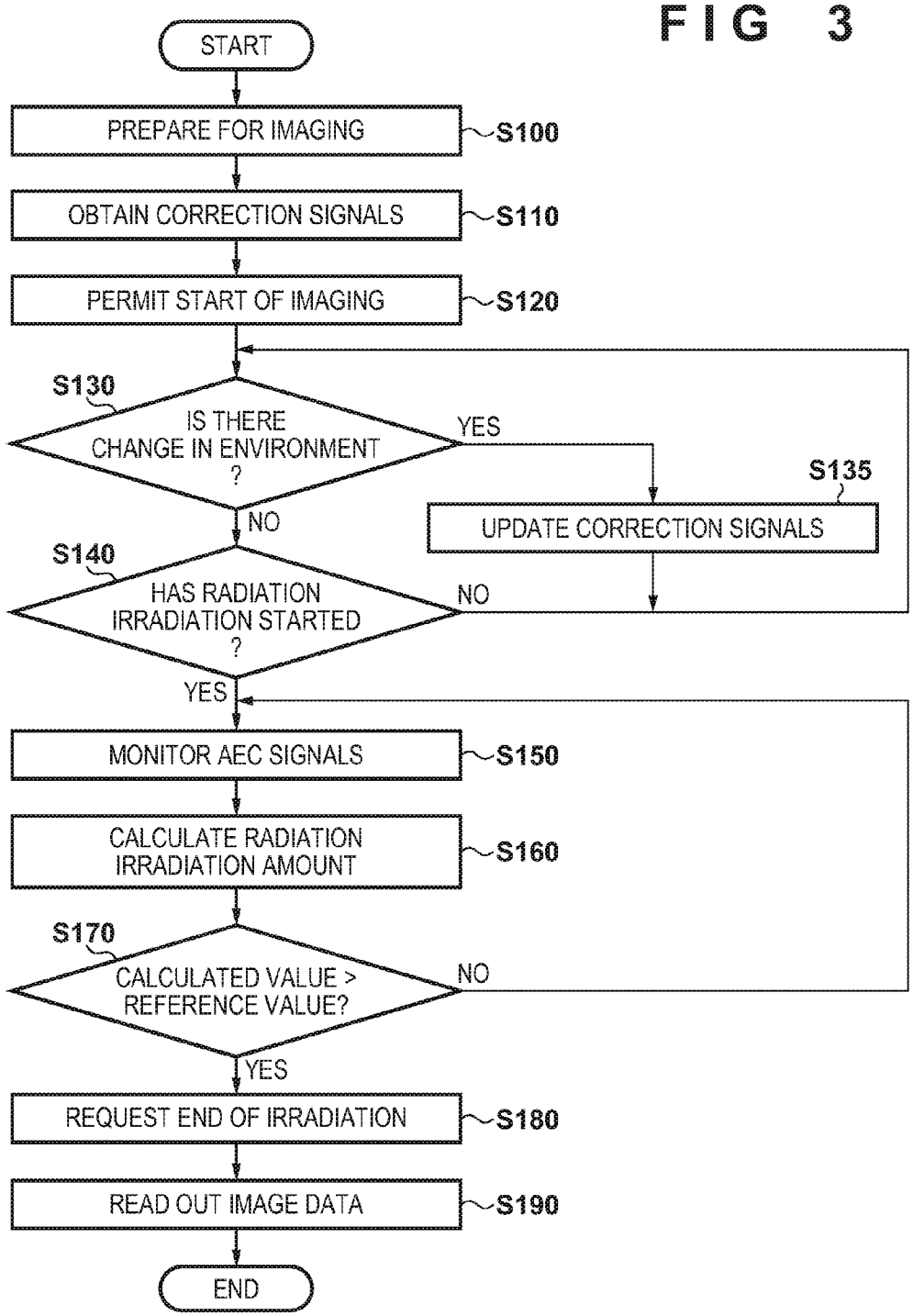

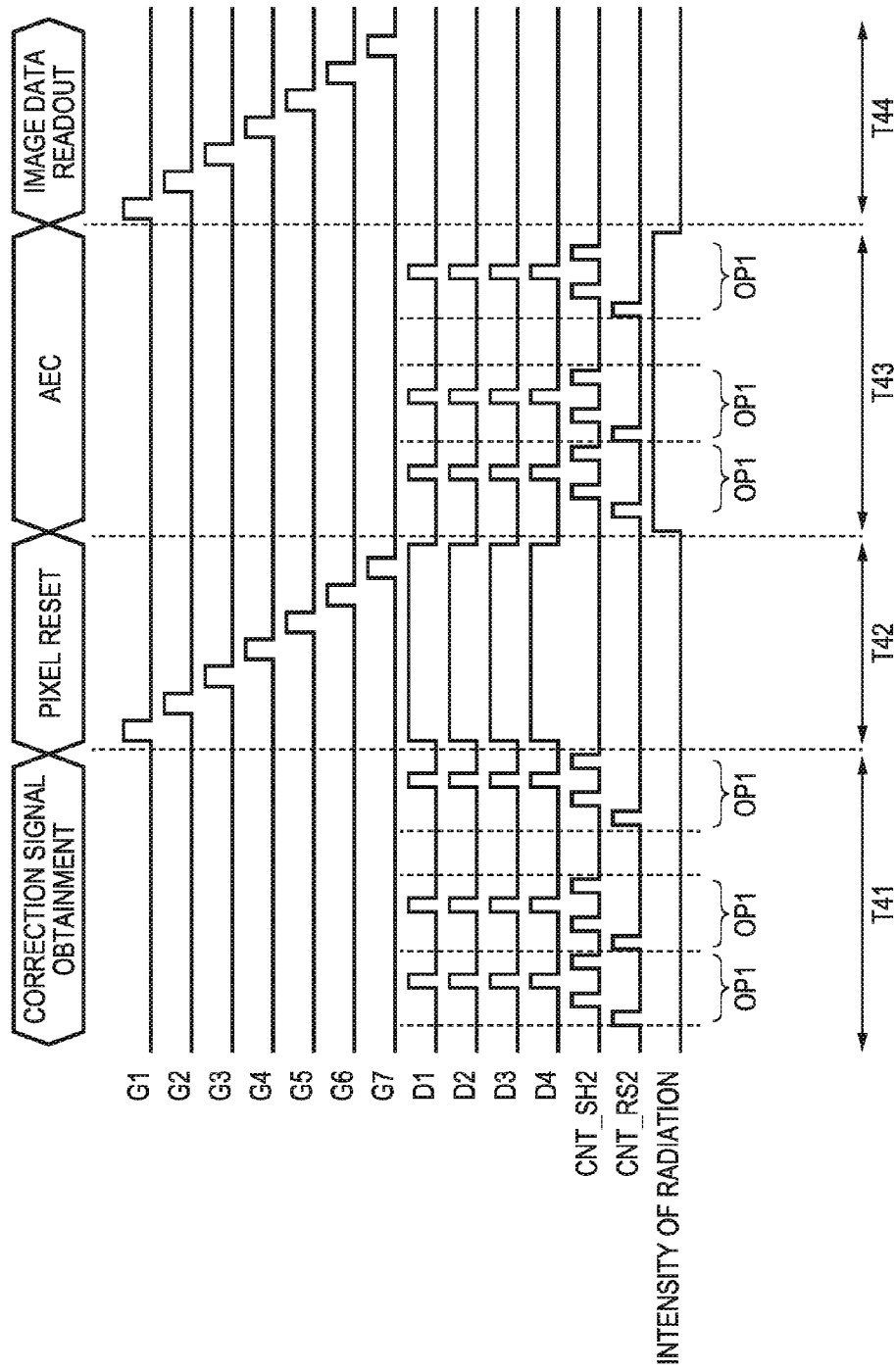

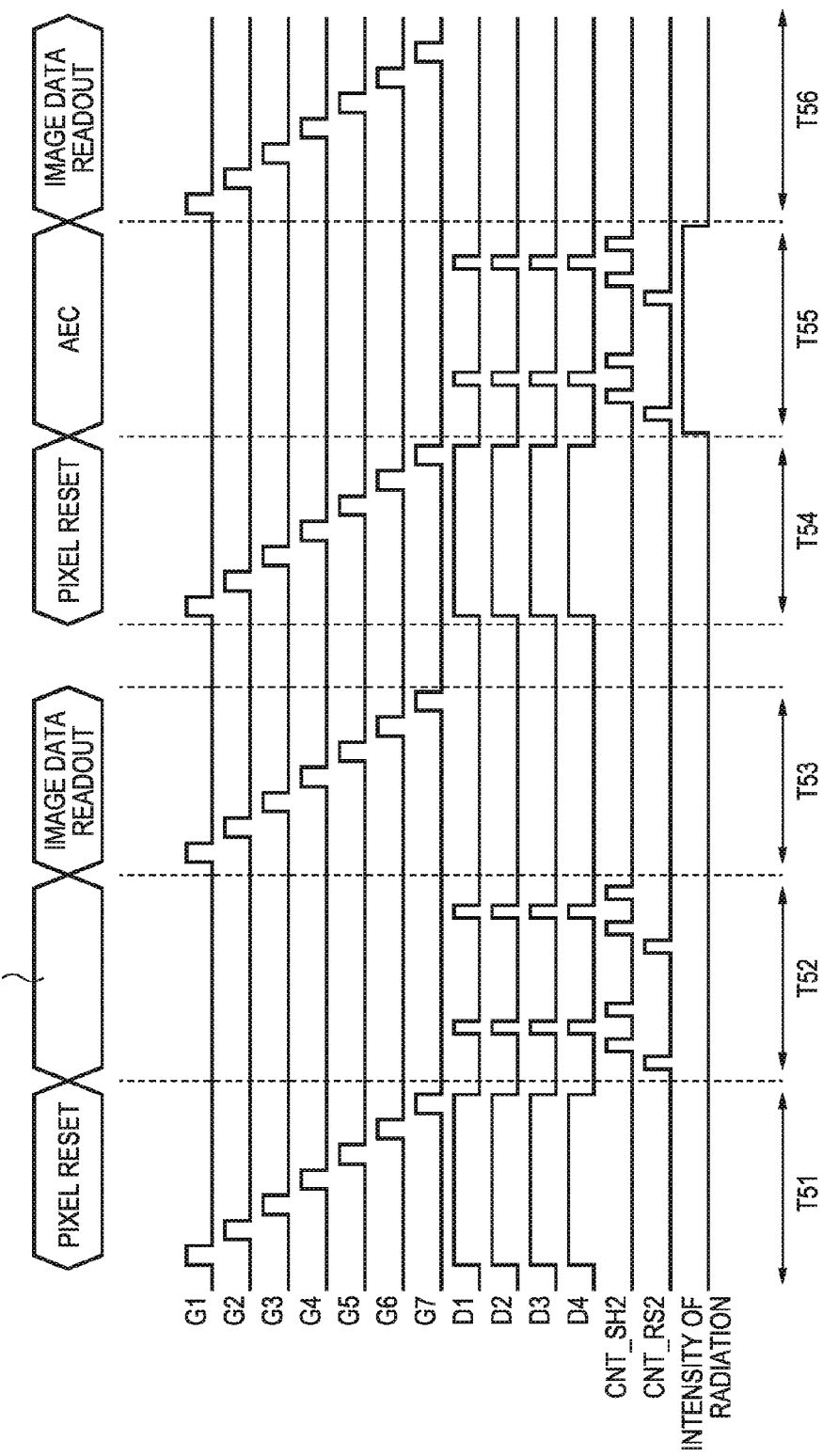

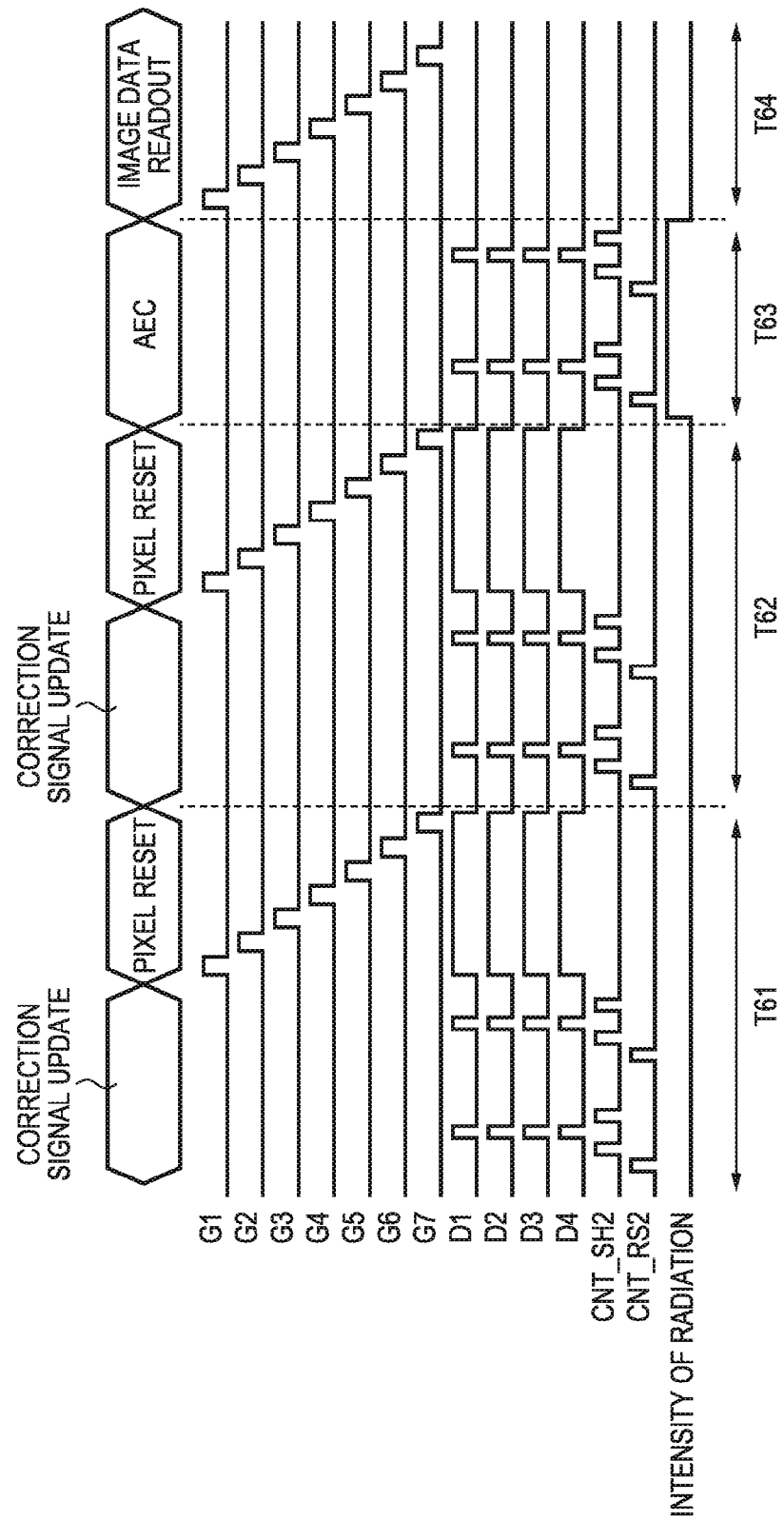

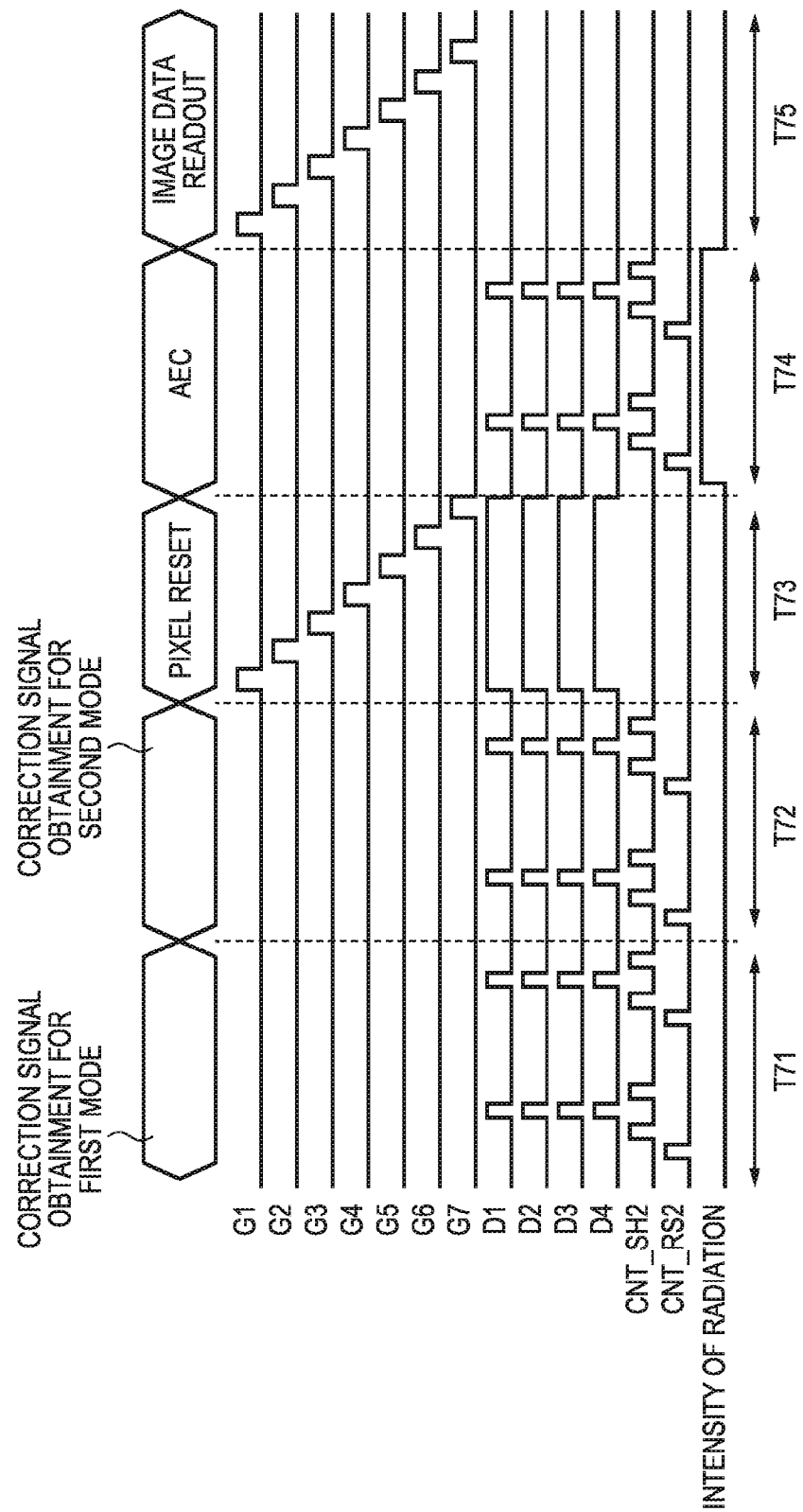

US 9,838,638 B2

RADIATION IMAGING APPARATUS, METHOD OF DRIVING THE SAME, AND RADIATION IMAGING SYSTEM

BACKGROUND OF THE INVENTION

Field of the Invention

The present invention relates to a radiation imaging apparatus, a method of driving the same, and a radiation imaging system.

Description of the Related Art

A radiation imaging apparatus can include, for example, a pixel array in which a plurality of pixels are arrayed in a matrix and a readout unit which reads out a pixel signal from each pixel. Signal lines (also referred to as column signal lines) corresponding to columns are arranged on the pixel array, and each pixel can include, for example, a detecting element which detects radiation and a switch element which connects the detecting element with a corresponding signal line. When the switch element is changed to a conductive state, a pixel signal is read out by the readout unit via a corresponding signal line.

Among radiation imaging apparatuses, there is an apparatus that requests the end of radiation irradiation (for example, generates a signal to end radiation irradiation) in accordance with the radiation irradiation amount reaching a reference value. Such control is called auto exposure control (AEC). In Japanese Patent Laid-Open No. 2012-15913 (paragraph 0094), some of the plurality of pixels are driven in a predetermined cycle to read out pixel signals, and AEC is performed based on the readout signal values.

Each signal read out by the readout unit contains an offset component which is a type of noise. The offset component corresponds to the potential of the signal line when each pixel signal is not being read out (that is, when the switch element is in a non-conductive state) or the output value of the readout unit corresponding to the potential. The offset component can decrease the accuracy of AEC. Here, to prevent the decrease in the accuracy of AEC, a method of performing AEC based on a difference between the offset component obtained by changing the switch elements to the non-conductive state and the pixel signals obtained by changing the switch elements to the conductive state can be considered.

However, the offset component may change before and after the switch elements are changed to the conductive state. Hence, it is difficult to prevent the accuracy of AEC from decreasing if AEC is performed simply based on the difference between the offset component and the pixel signals.

SUMMARY OF THE INVENTION

The present invention provides a technique advantageous in increasing the accuracy of AEC in a radiation imaging apparatus.

One of the aspects of the present invention provides a radiation imaging apparatus, comprising a plurality of pixels, a unit which is a unit different from the pixels and includes a detecting element configured to detect radiation and a switch element corresponding to the detecting element, a signal line configured to transmit a signal output from the detecting element in accordance with the switch element changing to a conductive state, and a controller, wherein the controller performs a first operation of obtaining, before a start of radiation irradiation to the radiation imaging apparatus, a signal of the signal line when the switch element is in a non-conductive state and a signal of the signal line when the switch element is in the conductive state as a first signal and a second signal, respectively, a second operation of obtaining, in response to the start of the radiation irradiation, a signal of the signal line when the switch element is in the non-conductive state and a signal of the signal line when the switch element is in the conductive state as a third signal and a fourth signal, respectively, a third operation of calculating, based on the first signal, the second signal, the third signal, and the fourth signal, an irradiation amount of the radiation since the start of the radiation irradiation and outputting a signal to end the radiation irradiation in response to the irradiation amount reaching a reference value, and a fourth operation of reading out image data from the plurality of pixels after the end of the radiation irradiation.

Further features of the present invention will become apparent from the following description of exemplary embodiments with reference to the attached drawings.

BRIEF DESCRIPTION OF THE DRAWINGS

FIG. 1 is a view for explaining the arrangement of a radiation imaging apparatus;

FIG. 3 is a flowchart for explaining an example of a driving method of the radiation imaging apparatus;

FIG. 4 is a timing chart for explaining the driving method of the radiation imaging apparatus;

FIG. 5 is a timing chart for explaining a driving method of a radiation imaging apparatus;

FIGS. 6A and 6B are timing charts for explaining the driving method of the radiation imaging apparatus.

DESCRIPTION OF THE EMBODIMENTS

Figure 2A:
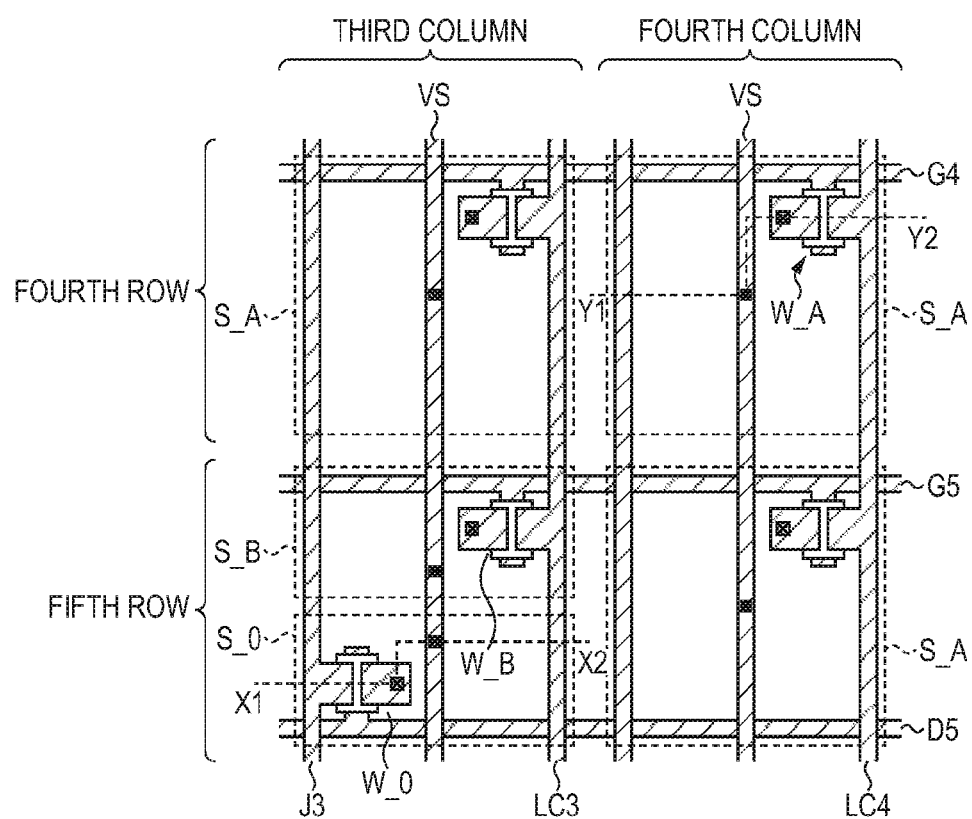
FIGS. 2A, 2B, and 2C are views for explaining a part of the structure of a pixel array.

Preferred embodiments of the present invention will be described below with reference to the accompanying drawings. Note that the respective drawings are merely drawn for the purpose of explaining structures and arrangements, and the scales of respective members shown in the drawings do not always reflect actual scales. Throughout the drawings, the same reference numerals denote the same members or components, and a repetitive description thereof will be omitted.

First Embodiment

A radiation imaging apparatus 100 according to the first embodiment will be described with reference to FIGS. 1 to 4. As exemplified in FIG. 1, the radiation imaging apparatus 100 includes a pixel array 110 in which a plurality of pixels PX are arrayed in a matrix, a driving unit 120 that drives the pixels PX, a readout unit 130 that reads out a pixel signal from each pixel PX, and a controller 140. Here for the sake of descriptive convenience, the pixel array 110 having 7 rows×6 columns has been exemplified. In fact, however, the pixels can be arrayed to form several thousand rows and columns or more.

The plurality of pixels PX can include, for example, pixels PX_A and pixels PX_B which are different from the pixels PX_A. Although details will be described later, the pixels PX_B are smaller in size than the pixels PX_A, and the radiation imaging apparatus 100 further includes units UM each arranged in the pixel array 110 so as to form a 1 row×1 column unit together with each pixel PX_B. In this specification, when there is no need to particularly differentiate between the pixels PX_A and the pixels PX_B, they will be simply referred to as the pixels PX.

Each pixel PX_A can include, as that shown in the first row and the first column of FIG. 1, a sensor S and a transistor W which can be made of, for example, amorphous silicon. The sensor S is a detecting element for detecting radiation. If the radiation imaging apparatus 100 further includes a scintillator (not shown) on the radiation entry side of the pixel array 110, a photoelectric conversion element such as a PIN sensor or a MIS sensor can be used as the sensor S. Each sensor S can be supplied with power and a reference voltage from a power supply unit 150 via a bias line VS (power supply line). In addition, each transistor W changes to a conductive state or a non-conductive state in response to a control signal. A switch element such as a thin film transistor can be used as the transistor W.

The pixels PX_B and the units UM each can have, as those shown in the fifth row and the sixth column of FIG. 1, the same circuit arrangement as that of the pixel PX_A. Each unit UM forms a 1 row×1 column unit with the corresponding pixel PX_B. The unit UM is located in, in this example, the second row and the second column, the third row and the second column, the second row and the fifth column, the third row and the fifth column, the fifth row and the third column, the sixth row and the third column, the fifth row and the sixth column, and the sixth row and the sixth column. Note that, in this specification, for the sake of differentiation, the sensor S of the pixel PX_A, the sensor S of the pixel PX_B, and the sensor S of the unit UM may be represented as a sensor S_A, a sensor S_B, and a sensor S_0, respectively. However, when there is no need to differentiate between them, they will simply be represented as the sensors S. The same applies to the transistors W. (That is, the transistor W of the pixel PX_A, the transistor W of the pixel PX_B, and the transistor W of the unit UM may be represented as a transistor W_A, a transistor W_B, and a transistor W_0, respectively.)

The driving unit 120 uses gate lines G1 to G7 to select and drive the pixels PX of the pixel array 110 row by row and uses gate lines D2, D3, D5, and D6 to select and drive the units UM row by row.

A plurality of signal lines LC1 to LC6, J2, J3, J5, and J6 are arranged on the pixel array 110. The signal lines LC1 to LC6 are column signal lines corresponding to the first to sixth columns, respectively. Each of the signal lines LC1 to LC6 is connected to the transistor W of each pixel PX in the corresponding column, and a signal from the corresponding sensor S_A or S_B is transmitted when the transistor W changes to the conductive state. Additionally, the signal lines J2, J3, J5, and J6 are other column signal lines corresponding to the second, the third, the fifth, and the sixth columns, respectively. Each of the signal lines J2, J3, J5, and J6 is connected to the transistors W of the units UM in the corresponding column, and a signal from the corresponding sensor S_0 is transmitted when each transistor W changes to the conductive state.

The readout unit 130 can include signal amplification units A1 and sampling units SH1 corresponding to the respective signal lines LC1 to LC6 and signal amplification units A2 and sampling units SH2 corresponding to the respective signal lines J2, J3, J5, and J6. Each signal amplification unit A1 amplifies a signal output from each pixel PX via the corresponding signal line LC1 or the like, and each sampling unit SH1 samples the amplified signal. In the same manner, each signal amplification unit A2 amplifies a signal output from each unit UM via the corresponding signal line J2 or the like, and each sampling unit SH2 samples the amplified signal.

The readout unit 130 can further include a multiplexer 131 and a signal processing unit 132. The multiplexer 131 transfers sequentially or selectively, for example, the signals sampled in the sampling units SH1 and SH2 to the signal processing unit 132. The signal processing unit 132 can include, for example, a signal amplification unit, an AD conversion unit, a data output unit, and the like. The signal processing unit 132 processes, for example, the signals from the pixels PX and generates image data that represents a radiation image. In addition, although the details will be described later, the signal processing unit 132 performs signal processing to perform auto exposure control (AEC) (to be described later) on the signals from the units UM.

The controller 140 controls the aforementioned units so that radiation imaging will be implemented properly. The controller 140 can include, for example, a dedicated circuit (such as an ASIC) for implementing the functions described in this specification or another semiconductor device which can be programmed or is stored with the programs of the respective functions. In another example, the controller 140 may include a computer (a general personal computer or the like) which is a computer that has a CPU and memories and is stored with the programs of the respective functions. In this case, some or all of the operations of the controller 140 may be implemented by software.

Figure 2B:
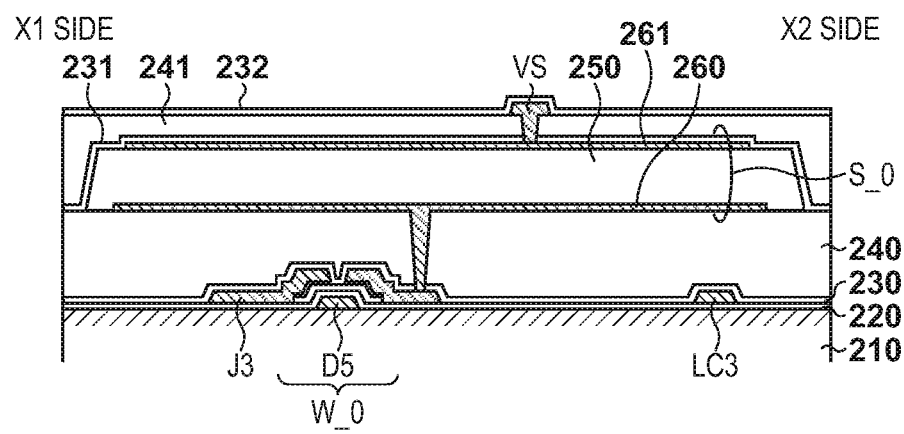
Figure 2C:
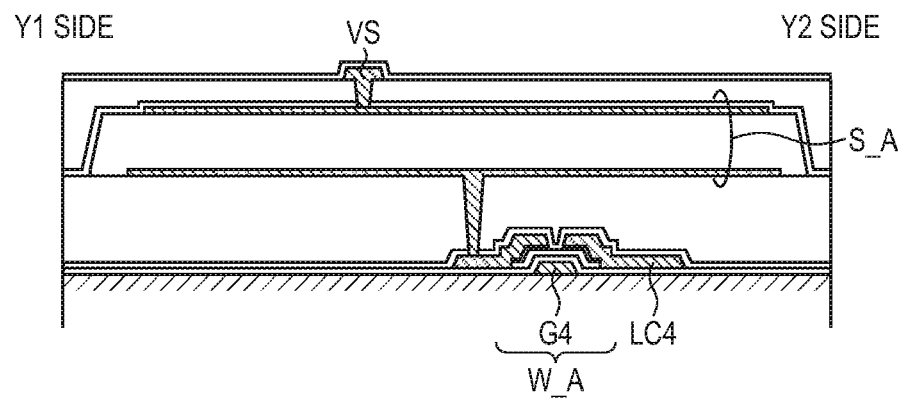

FIG. 2A is a schematic view showing the upper surface layout of the portion of the fourth row to the fifth row and the third column to the fourth column of the pixel array 110. In FIG. 2A, in the fifth row and the third column, the pixel PX_B and the unit UM are arranged, and the pixels PX_A are arranged in other positions. FIG. 2B is a schematic view showing a cross-sectional structure taken along a cut line X1-X2 in FIG. 2A. FIG. 2C is a schematic view showing a cross-sectional structure taken along a cut line Y1-Y2 in FIG. 2A.

According to FIG. 2A, in a planar view with respect to the upper surface of a substrate arrayed with the pixels PX (to be simply referred to as a "planar view" hereinafter), the transistor W_A of each pixel PX_A is arranged to overlap the corresponding sensor S_A at the corner portion. For example, referring to the pixel P_A in the fourth row and the third column, the gate line G4 is arranged along the row direction so as to be near the transistor W_A, and the signal line LC3 is arranged along the column direction so as to be near the transistor W_A. This applies to other pixels PX_A as well.

In the fifth row and the third column, the pixel PX_B is arranged on the upper side and the unit UM is arranged on the lower side of FIG. 2A. Aside from the fact that the size of the sensor S_B is smaller than the sensor S_A in a planar view, the pixel PX_B can be formed in the same manner as the pixel PX_A.

The unit UM is arranged in the fifth row and the third column together with the pixel PX_B. In this example, the size of the sensor S_0 is approximately equal to that of the sensor S_B in a planar view and is arranged substantially in point symmetry with the pixel PX_B. Along with this, the gate line D5 is arranged parallel (along the row direction) to the gate line G5 on a side opposite to the side on which the gate line G5 has been arranged to be near the transistor W_0. In the same manner, the signal line J3 is arranged parallel (along the column direction) to the signal line LC3 on a side opposite to the side on which the signal line LC3 has been arranged to be near the transistor W_0.

The bias line VS for supplying power to the sensors S is arranged along the column direction in corresponding with each column. For example, referring to the third column, the bias line VS is arranged between the signal line LC3 and the signal line J3 to be parallel (along the column direction) to these signal lines.

The pixels PX and units UM are formed by arranging, for example, members that form the aforementioned components on a substrate 210 formed by an insulating member such as glass. For example, referring to FIG. 2B (although a description will be omitted here, the same applies to FIG. 2C), an electrode D5 corresponding to the gate of the transistor W_0 is arranged on the substrate 210, and an insulating film 220 is arranged to cover the substrate 210 and the electrode D5. The insulating film 220 is arranged on the electrode D5, and a semiconductor member forming the channel of the transistor W_0 is arranged on the insulating film 220. On both ends of the semiconductor member, electrodes corresponding to the drain and the source, respectively, are arranged.

The electrode corresponding to the above-described drain can be formed integrally with the signal line J3. In other words, the signal line J3 extends to the side of the transistor W_0 as the electrode corresponding to the drain. On the other hand, the electrode corresponding to the above-described source is connected to the sensor S_0 arranged on an interlayer insulating film 240 which is formed on a protective film 230. The protective film 230 is arranged on the transistor W_0 and the signal line LC3 which are arranged on the substrate 210. More specifically, the sensor S_0 can include a semiconductor portion 250 which forms a pin junction, and a lower-side electrode 260 and an upper-side electrode 261 arranged on the lower side and the upper side of the sensor S_0, respectively. The electrode corresponding to the source is in contact with the lower-side electrode 260 through a contact hole.

The bias line VS is arranged on an interlayer insulating film 241 on a protective film 231 which is formed on the sensor S_0. The bias line VS is in contact with the upper-side electrode 261 through a contact hole. Furthermore, a protective film 232 is arranged so as to cover the interlayer insulating film 241 and the bias line VS.

An example of a driving method and a control method of the above-described radiation imaging apparatus 100, particularly, a method of auto exposure control (AEC) according to this embodiment will be described below with reference to FIGS. 3 and 4. The method to be described below can be implemented mainly by the controller 140 controlling the aforementioned units such as the driving unit 120 and the readout unit 130, and a part of the method may be implemented by or together with another unit as needed. Note that this applies to other embodiments to be described hereinafter.

FIG. 3 is an example of a flowchart for explaining this method. FIG. 4 is an example of a timing chart corresponding to this method. In FIG. 4, the abscissa corresponds to the time axis, and the potential of the gate lines G1 to G7 and D1 to D4, other signals (CNT_SH2 and CNT_RS2), and the radiation intensity are indicated on the ordinate.

When the gate lines G1 to G7 and D1 to D4 are high level (H level), the corresponding transistors W change to the conductive state, and when the gate lines are low level (L level), the corresponding transistors W change to the non-conductive state. The signal CNT_SH2 is a control signal of the sampling units SH2 that have been described with reference to FIG. 1. When the signal CNT_SH2 changes to H level, the signal of the signal line J2 or the like is sampled. The signal CNT_RS2 is a control signal for resetting (initializing) the potential of the signal lines J2, J3, J5, and J6. When the signal CNT_RS2 changes to H level, the potential of the signal line J2 or the like is reset. The radiation intensity corresponds to the radiation irradiation amount per unit time. When the radiation intensity is L level, radiation irradiation is not performed. When the radiation intensity is H level, radiation irradiation is performed. Here for the sake of descriptive convenience, each of these signals is represented by an ideal rectangular waveform.

In step S100 (to be simply referred to as "S100" hereinafter) (the same applies to other steps), preparation for imaging is performed. More specifically, the radiation imaging apparatus 100 stands by from power supply to the radiation imaging apparatus 100 until a state in which the units can perform radiation imaging is obtained. Subsequently, initial settings (such as parameter settings) necessary for radiation imaging are performed on the units.

In S110, correction signals for properly performing AEC (to be described later) are obtained. S110 corresponds to a period T41 shown in FIG. 4 and is performed before the start of radiation irradiation (in a state without radiation irradiation).

S110 can be performed, for example, by repeating a series of operations OP1 in which H level pulses are supplied in the order of the signals CNT_RS2, CNT_SH2, D1 to D4, and CNT_SH2. Note that "H level pulses are supplied" represents the act of returning the pulse level to L level after changing the pulse level to H level and keeping it at H level for a predetermined period. This act may be simply referred to as "change to H level" for the sake of descriptive convenience hereinafter.

In one operation OP1, first, after the signal CNT_RS2 is changed to H level and the signal line J2 or the like is reset, a first signal is obtained by changing the signal CNT_SH2 to H level and sampling the signal of the reset signal line J2 or the like. Next, the gate line D1 or the like is changed to H level to cause the signal line J2 or the like to transmit the signal of the corresponding sensor S. The signal of the signal line J2 or the like that has undergone potential change is sampled by changing the signal CNT_SH2 to H level, thereby obtaining a second signal.

In this specification, the above-described first signal is represented as a signal SIG1 and the above-described second signal is represented as a signal SIG2. That is, the signal SIG1 corresponds to the signal of the signal line J2 or the like when the transistor W_0 is in the non-conductive state (a state in which the gate line D1 or the like is at L level). In addition, the signal SIG2 corresponds to the signal of the signal line J2 or the like when the transistor W_0 is in the conductive state (a state in which the gate line D1 or the like is at H level). For example, the signal (voltage) of the signal line J2 or the like may change before and after the transistor W_0 is changed to the conductive state, and the signal value of the signal SIG1 and the signal value of the signal SIG2 can become different from each other. This is considered to be caused by, for example, charges becoming trapped in the transistor W_0.

The correction signals SIG1 and SIG2 may be calculated based on a plurality of results (more specifically, based on the average value, median value, standard deviation, and the like of the results) obtained from the above-described repetitively performed operation OP1. Here, a case in which the operation OP1 is repetitively performed (the operation OP1 is performed a plurality of times) has been exemplified.

However, the operation OP1 may be performed only once, and the signals SIG1 and SIG2 may be calculated based on the result obtained from this one operation OP1.

In S120, a signal indicating a permission to start imaging is output, and a user can determine the start of radiation irradiation in accordance with this signal output. A pixel reset operation corresponding to a period T42 shown in FIG. 4 may be performed together with this step. More specifically, the gate lines G1 to G7 are sequentially changed to H level. This operation corresponds to an initialization operation (reset operation), and a noise component (noise component due to a dark current and the like) that can be generated in each pixel PX can be removed. At this time, since the units UM are kept in an active state by keeping the gate lines D1 to D4 at H level, it is possible to detect the start of radiation irradiation based on the signals from the units UM.

In S130, it is determined whether the environment in the apparatus 100 has changed since the correction signals SIG1 and SIG2 have been obtained in S110. Here, the environment can include the temperature in the apparatus 100, the noise amount of electromagnetic waves, the pressure toward the apparatus 100 (for example, the air pressure and the pressing force), and the like. The apparatus 100 may further include another sensor (not shown) for detecting at least one of them. If the environment in the apparatus 100 has changed, the process advances to S135. Otherwise, the process advances to S140.

In S135, the correction signals SIG1 and SIG2 can be updated by the same procedure as that in step S110. That is, in S135, the correction signals SIG1 and SIG2 corresponding to the changed environment described above are newly obtained. In S135, the aforementioned pixel reset operation (refer to the period T42) may be stopped and restarted after the correction signals SIG1 and SIG2 have been updated.

In S140, it is determined whether radiation irradiation has started. If radiation irradiation has not started, the process returns to S130. Otherwise, the process advances to S150. S140 may be performed, for example, based on the signals from the units UM as described above. Alternatively, it may be performed based on the change in the current amount of the bias line VS or may be performed based on a dedicated detection unit prepared separately.

In S150, AEC signals are monitored. S150 corresponds to a period T43 shown in FIG. 4. S150 can be performed by the same procedure as that of the operation of the period T41, that is, it can be performed by repeating the series of operations OP1 in which the signal CNT_RS2, the signal CNT_SH2, the signals D1 to D4, and the signal CNT_SH2 are sequentially changed to H level. In one operation OP1, first, a third signal is obtained by sampling the signal of the signal line J2 or the like after the signal CNT_RS2 is changed to H level (after the signal line J2 or the like has been reset) in a state in which the gate line D1 or the like is L level. Next, a fourth signal is obtained by sampling the signal of the signal line J2 or the like in a state in which the gate line D1 or the like is H level (after the signal of each sensor S has been transmitted by the signal line J2 or the like). In this specification, the above-described third signal is represented as a signal SIG3 and the above-described fourth signal is represented as a signal SIG4. That is, in S150, the operation OP1 is repeated in a predetermined cycle, and the AEC signals SIG3 and SIG4 are read out and monitored in the predetermined cycle.

In S160, based on the AEC signals SIG3 and SIG4 and the correction signals SIG1 and SIG2, the irradiation amount (the amount corresponding to the time integration of the intensity of radiation) since the start of radiation irradiation is calculated. More specifically, the AEC signals SIG3 and SIG4 are corrected by the correction signals SIG1 and SIG2, and the corrected AEC signals SIG3 and SIG4 are accumulated. This will be described with reference to simple equations below.

As already described with reference to S110 and the period T41, the signal (voltage) of the signal line J2 or the like may change between the non-conductive state and the conductive state of the transistor W_0. Hence, the signal values of the respective correction signals SIG1 and SIG2 can respectively be represented as $$SIG1 = SS0a + SX1,$$

$$SIG2 = SS0b + SX1$$

where $SS0a$ represents an offset component of the transistor W_0 in the non-conductive state, $SS0b$ represents an offset component of the transistor W_0 in the conductive state, and SX1 represents another noise component present before radiation irradiation.

In the same manner, after radiation irradiation, the signal of the signal line J2 or the like may change between the non-conductive state and the conductive state of the transistor W_0. Hence, the signal values of the AEC signals SIG3 and SIG4 can respectively be represented as $$SIG3 = SS0a + SX2$$

$$SIG4 = SS0b + SX2 + SA$$

where SX2 represents another noise component present during radiation irradiation, and SA represents a signal component from the unit UM.

Here, if the difference between the AEC signals SIG3 and SIG4 is simply calculated, it becomes SIG4−SIG3=SA+($SS0b$−$SS0a$), and the signal component SA itself cannot be properly obtained. That is, upon performing AEC, an error that corresponds to ($SS0b$−$SS0a$) can be generated. Therefore, in this embodiment, the component corresponding to ($SS0b$−$SS0a$) is removed by (SIG4−SIG3)−(SIG2−SIG1), and the signal component SA is properly obtained. Note that a method of calculating the difference between two or more signals has been exemplified here. However, the readout method of these signals may be changed to obtain the signal component SA by addition processing.

In S160, the irradiation amount since the start of radiation irradiation is calculated by accumulating the signal components SA obtained in this manner. In S170, it is determined whether the calculated value (radiation irradiation amount) obtained by the calculation in S160 has reached a reference value (a set value, an allowable value, an upper limit value, or the like of the radiation irradiation amount). If the calculated value has not reached the reference value, the process returns to S150. Otherwise, the process advances to S180. In S180, a signal requesting the end of radiation irradiation is output, and the radiation irradiation is ended.

After the end of radiation irradiation, image data is read out in S190. S190 corresponds to a period T44 shown in FIG. 4. More specifically, the gate lines G1 to G7 are sequentially changed to H level, and signals are sequentially read out row by row from the pixels PX. This operation corresponds to a readout operation and results in the generation of image data. This operation may also be called an image data generation operation, image data obtaining operation, or the like.

Here, as described above, each pixel PX_B is smaller in size than each pixel PX_A. Hence, even if these pixels have received the same dose of radiation, the signal value from each pixel PX_B can be smaller than the signal value from each pixel PX_A. Therefore, for the signal from each pixel PX_B, it is preferable to perform signal processing or correction processing using a gain according to the size ratio (more specifically, the size ratio between the sensor S_A and the sensor S_B in a planar view). From another viewpoint, the gain used for the signal from each pixel PX_B is made larger than the gain used for the signal from each pixel PX_A.

According to this embodiment, steps S150 to S180 correspond to an AEC operation, and steps S110 and S135 correspond to a preparation operation or a calibration operation for properly performing the AEC operation (particularly, the calculation operation in S160). More specifically, before the start of radiation irradiation, the correction signals SIG1 and SIG2 are obtained by the operation OP1. These correction signals SIG1 and SIG2 allow the offset component difference between the non-conductive state and the conductive state of the transistor W_0 to be calculated. Subsequently, during radiation irradiation, the AEC signals SIG3 and SIG4 are monitored by repetitively performing the operation OP1, and the AEC signals SIG3 and SIG4 are corrected by the correction signals SIG1 and SIG2. As a result, the offset component difference between the AEC signals SIG3 and SIG4 can be eliminated, and AEC can be properly performed based on the corrected AEC signals SIG3 and SIG4. Hence, this embodiment is advantageous in increasing the accuracy of AEC.

Second Embodiment

The second embodiment will be described with reference to FIG. 5. FIG. 5 is an example of a timing chart of AEC according to this embodiment. This embodiment is different from the first embodiment (refer to FIG. 4) in that the operations before and after the operation of obtaining correction signals SIG1 and SIG2 are the same as the operations before and after the AEC operation. That is, in FIG. 5, a pixel reset operation is performed in a period T51, the correction signals SIG1 and SIG2 are obtained in a period T52, and image data readout is performed in a period T53. Subsequently, until radiation irradiation is started (in a period T54), the pixel reset operation is performed, AEC is performed in a period T55, and image data is read out in a period T56. The operations of the periods T52, T54, T55, and T56 are the same as the operations of the periods T41, T42, T43, and T44 described with reference to FIG. 4, respectively.

According to this embodiment, the pixel rest operation is performed in the period T51 before the period T52 which is for obtaining the correction signals SIG1 and SIG 2, and the image data is read out in the period T53 after the period T52. Hence, the correction signals SIG1 and SIG2 in the period T52 can be obtained under the same conditions as AEC signals SIG3 and SIG4 in the period T55. As a result, the offset component of the correction signal SIG1 and the offset component of the AEC signal SIG3 can become closer, and the offset component of the correction signal SIG2 and the offset component of the AEC signal SIG4 can become closer. That is, according to this embodiment, the offset component difference between the AEC signals SIG3 and SIG4 can be eliminated more properly. Hence, this embodiment is advantageous in increasing the accuracy of AEC.

Note that, here, a case in which both the pixel reset operation of the period T51 and the image data readout of the period T53 are performed has been exemplified. However, the influence toward the offset components of the correction signals SIG1 and SIG2 can be, in particular, caused by the pixel reset operation of the period T51. Therefore, in another example, while the pixel reset operation in the period T51 is performed, the image data readout in the period T53 may be omitted.

Modifications

Modifications will be described with reference to FIGS. 6A and 6B.

FIG. 6A is the first modification of the timing chart of the AEC operation. In the first modification, if the correction signals SIG1 and SIG2 are not obtained properly in a period T61, the correction signals SIG1 and SIG2 are obtained again in a subsequent period T62. For example, as a case in which the correction signals SIG1 and SIG2 are not obtained properly, a case in which the signal values of the correction signals have singular values (a case in which the signal values exceed a predetermined range) can be considered. The determination as to whether the correction signals SIG1 and SIG2 have been obtained properly, for example, can be performed in the radiation imaging apparatus 100 by the controller 140 or the like while the pixel reset operation is performed.

In addition, as a case in which the correction signals SIG1 and SIG2 are not obtained properly, for example, a case in which the environment (the temperature and the like, as described above) of the radiation imaging apparatus 100 has changed while obtaining the correction signals SIG1 and SIG2 can be considered. In order to prevent the correction signals SIG1 and SIG2 from being obtained again repetitively, the obtainment of the correction signals SIG1 and SIG2 may be started in response to the stabilization of the environment (for example, the temperature changes to a steady state, more specifically, the temperature has settled within a predetermined allowable range). In another example, time enough for the environment to stabilize may be obtained beforehand, and obtainment of the correction signals SIG1 and SIG2 may be started in response to the elapse of this time.

The operations of periods T63 and T64 are the same as the operations of the periods T43 and T44 described with reference to FIG. 4, respectively.

FIG. 6B is the second modification of the timing chart of the AEC operation. For example, the radiation imaging apparatus 100 can include two operation modes (to be referred to as a first mode and a second mode, respectively). In the second modification, the correction signals SIG1 and SIG2 for the first mode are obtained in a period T71, and the correction signals SIG1 and SIG2 are obtained for the second mode in a period T72. In the first mode and the second mode, for example, the signal levels (the supplied voltages) of the control signal can be different. In another example, the gain in the readout unit 130 can be different. In yet another example, if the pixels PX are formed to have a plurality of sensitivities, the sensitivities can be different. According to this example, by obtaining the correction signals SIG1 and SIG 2 for each operation mode in advance, even in a case in which radiation imaging is to be performed by one of the operation modes, AEC can be performed properly.

Although modifications about the driving method and the control method have been mainly described here, various modifications can be considered in terms of the arrangement. For example, the arrangement of the pixel array 110 (more specifically, the arrangements of the pixels PX_A, the pixels PX_B, and the units UM) is not limited to the examples shown in FIGS. 1 and 2 and can be partially changed without departing from the spirit or scope of the present invention. For example, in the embodiments, an arrangement in which the signals of the units UM and the signals of the pixels PX are read out using different signal lines has been exemplified. However, these signals may be read out by a common signal line (that is, the signal line LC2 or the like may be shared by the units UM). Even in this arrangement, each sensor signal when the transistor W_0 is in the conductive state and each sensor signal when the transistor W_0 is in the non-conductive state can be output so that their difference is obtained.

The pixels PX_B and the units UM in the pixel array 110 can be arranged in the region of interest for the user. Alternatively, if an imaging target portion is already determined, the arrangement positions can be determined based on the portion. Typically, the pixels PX_B and the units UM are arranged in the peripheral region or the corner regions of the pixel array 110. Additionally, in this example, an arrangement in which two pairs of the pixel PX_B and unit UM are arranged in the column direction has been shown. However, the number of the arrangements may be one pair or three or more pairs may be continuously arranged. Furthermore, they may be arranged in the row direction (or in both row and column directions).

Additionally, in the embodiments, an arrangement in which each unit UM is arranged together with each pixel PX_B to form a 1 row×1 column unit has been exemplified. However, each unit UM may be arranged so as to form a 1 row×1 column unit by itself. In this case, the pixel signal corresponding to this position can be complemented by the signal of an adjacent pixel PX. In another example, the units UM may be arranged outside the pixel array 110.

(Application Example to Radiation Imaging System)

Figure 7:
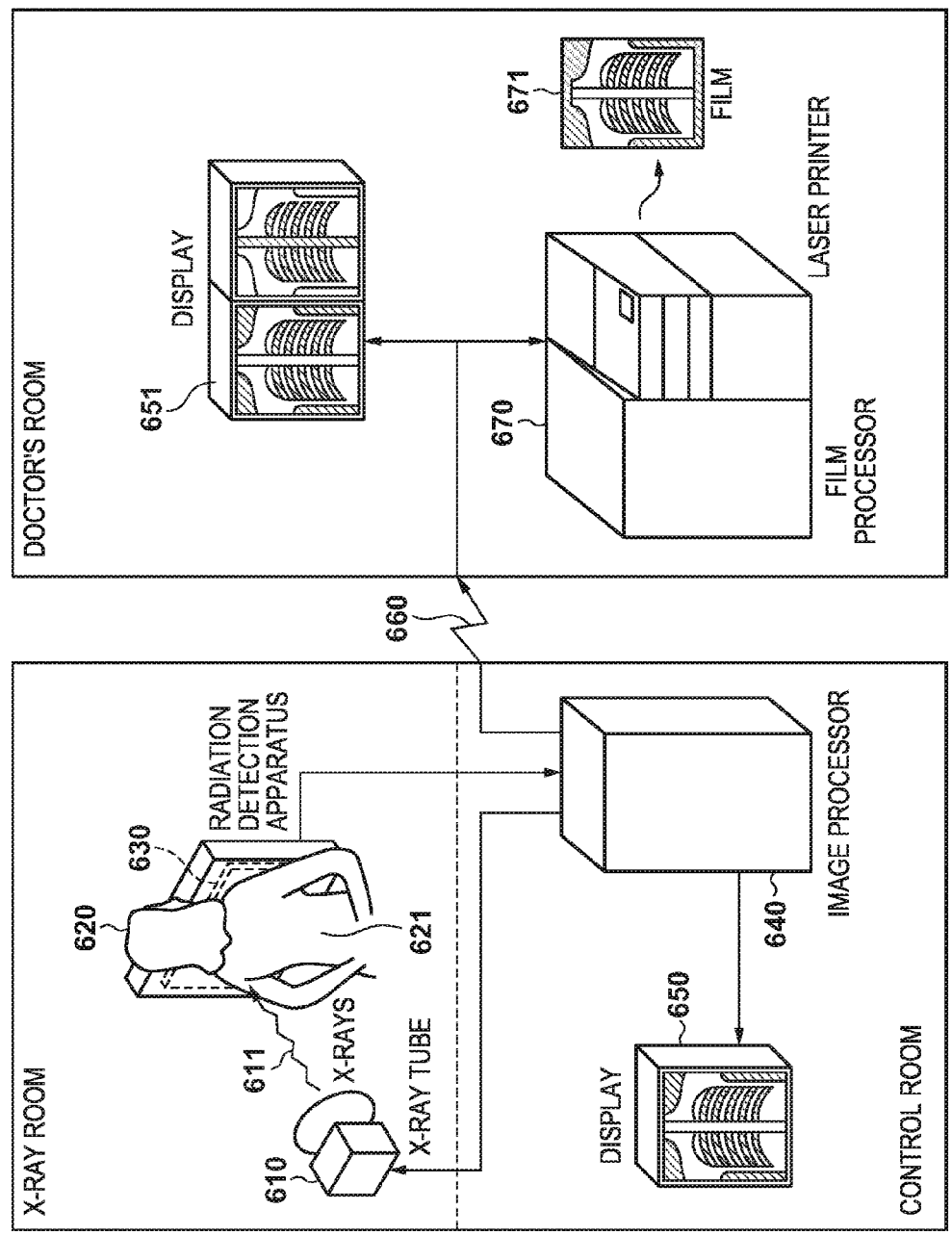
FIG. 7 is a view for explaining an example of the arrangement of an imaging system.

As exemplified in FIG. 7, the radiation imaging apparatus described in the above embodiments is applicable to an imaging system typified by a radiation inspection apparatus or the like. Radiation includes X-rays, α-rays, β-rays, and γ-rays. Here, a case using X-rays will be described as a typical example.

X-rays 611 generated by an X-ray tube 610 (radiation source) pass through a chest 621 of a subject 620 and enter a radiation imaging apparatus 630. The incident X-rays 611 includes information about the inside of the body of the patient 620, and the apparatus 630 obtains electrical information corresponding to the X-rays 611. This electrical information is converted into a digital signal and undergoes predetermined signal processing by, for example, an image processor 640 (signal processing unit). A user such as a doctor can observe a radiation image corresponding to the electrical information on, for example, a display 650 (display unit) in a control room. The user can transfer the radiation image or the data to a remote place by a predetermined communication means 660, and the radiation image can be observed on a display 651 at another place such as a doctor's room. The user can also record the radiation image or the data on a predetermined recording medium. For example, the radiation image or the data can be recorded on a film 671 by a film processor 670.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Several preferred embodiments have been described above, but the present invention is not limited to them. The embodiments may be partially changed without departing from the scope or spirit of the invention. For example, in the above-described embodiments, an arrangement (so-called indirect conversion type) that converts the radiation into light and photoelectrically converts the light has been exemplified. However, an arrangement (so-called direct conversion type) that directly converts the radiation into an electrical signal may be adopted.

In addition, each term described in this specification is merely used for the purpose of explaining the present invention. Obviously, the present invention is not limited to the strict meaning of each term, and can include equivalents of the respective terms.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-004613, filed on Jan. 13, 2016, which is hereby incorporated by reference wherein in its entirety.

What is claimed is:

1. A radiation imaging apparatus comprising:
   a plurality of pixels;
   a unit which is a unit different from the pixels and includes a detecting element configured to detect radiation and a switch element corresponding to the detecting element;
   a signal line configured to transmit a signal output from the detecting element in accordance with the switch element changing to a conductive state; and
   a controller,
   wherein the controller performs
   a first operation of obtaining, before a start of radiation irradiation to the radiation imaging apparatus, a signal of the signal line when the switch element is in a non-conductive state and a signal of the signal line when the switch element is in the conductive state as a first signal and a second signal, respectively, a second operation of obtaining, in response to the start of the radiation irradiation, a signal of the signal line when the switch element is in the non-conductive state and a signal of the signal line when the switch element is in the conductive state as a third signal and a fourth signal, respectively, a third operation of calculating, based on the first signal, the second signal, the third signal, and the fourth signal, an irradiation amount of the radiation since the start of the radiation irradiation and outputting a signal to end the radiation irradiation in response to the irradiation amount reaching a reference value, and a fourth operation of reading out image data from the plurality of pixels after the end of the radiation irradiation.

2. The apparatus according to claim 1, wherein the controller calculates, in the third operation, the irradiation amount of the radiation based on a first difference which is a difference between the first signal and the second signal and a second difference which is a difference between the third signal and the fourth signal.

3. The apparatus according to claim 2, wherein the controller calculates, in the third operation, the irradiation amount of the radiation based on a difference between the first difference and the second difference.

4. The apparatus according to claim 1, wherein the controller further performs, after the first operation and before the second operation, a first initialization operation of initializing each of the plurality of pixels, and before the first operation, a second initialization operation of initializing each of the plurality of pixels.

5. The apparatus according to claim 4, wherein an operation of reading out the image data is a first readout operation, and the controller further performs, after the first operation and before the first initialization operation, a second readout operation of reading out image data from the plurality of pixels.

6. The apparatus according to claim 1, wherein if at least one of a temperature in the radiation imaging apparatus, a noise amount in the radiation imaging apparatus, and a pressure to the radiation imaging apparatus has changed before the start of the radiation irradiation, the controller obtains a signal of the signal line when the switch element is in a non-conductive state and a signal of the signal line when the switch element is in the conductive state as a new first signal and a new second signal.

7. The apparatus according to claim 6, wherein the controller obtains, in the first operation, the first signal and the second signal when the at least one of the temperature in the radiation imaging apparatus, the noise amount in the radiation imaging apparatus, and the pressure to the radiation imaging apparatus has changed to a steady state.

8. The apparatus according to claim 1, wherein a plurality of modes are included as operation modes, and the controller obtains, in the first operation, the first signal and the second signal for each of the plurality of modes.

9. The apparatus according to claim 1, wherein the plurality of pixels include a first pixel and a second pixel smaller in size than the first pixel, the plurality of pixels are arranged so as to form a plurality of rows and a plurality of columns, and the first pixel corresponds to a unit of one row and one column, and the unit and the second pixel correspond to a unit of one row and one column.

10. The apparatus according to claim 9, wherein the signal line is arranged along a column in which the second pixel is arranged.

11. The apparatus according to claim 9, further comprising a plurality of column signal lines corresponding to the plurality of columns and each configured to read out a pixel signal from each pixel of a corresponding column, wherein a column signal line corresponding to the column in which the second pixel is arranged and the signal line are arranged parallel to each other.

12. The apparatus according to claim 9, wherein the controller performs, in the operation of reading out image data from the plurality of pixels, signal processing using a gain corresponding to a size ratio of the first pixel and the second pixel to a signal read out from the second pixel.

13. The apparatus according to claim 9, further comprising a power supply line configured to supply power to each of the plurality of pixels, the power supply line being arranged between a column signal line corresponding to the column in which the second pixel is arranged and the signal line to be parallel to the column signal line and the signal line in a planar view with respect to an upper surface of a substrate arrayed with the plurality of pixels.

14. A radiation imaging system comprising:

a radiation imaging apparatus defined in claim 1; and a processor configured to process a signal from the radiation imaging apparatus.

15. A method of driving a radiation imaging apparatus that includes a plurality of pixels, a unit which is a unit different from the pixels and includes a detecting element configured to detect radiation and a switch element corresponding to the detecting element, and a signal line configured to transmit a signal output from the detecting element in accordance with the switch element changing to a conductive state, the method comprising:

obtaining, before a start of radiation irradiation to the radiation imaging apparatus, a signal of the signal line when the switch element is in a non-conductive state and a signal of the signal line when the switch element is in the conductive state as a first signal and a second signal, respectively;

obtaining, in response to the start of the radiation irradiation, a signal of the signal line when the switch element is in the non-conductive state and a signal of the signal line when the switch element is in the conductive state as a third signal and a fourth signal, respectively;

calculating, based on the first signal, the second signal, the third signal, and the fourth signal, an irradiation amount of the radiation since the start of the radiation irradiation and outputting a signal to end the radiation irradiation in response to the irradiation amount reaching a reference value; and reading out image data from the plurality of pixels after the end of the radiation irradiation.

16. A radiation imaging apparatus comprising:

a plurality of pixels;

a unit which is a unit different from the pixels and includes a detecting element configured to detect radiation and a switch element corresponding to the detecting element;

a signal line configured to transmit a signal output from the detecting element in accordance with the switch element changing to a conductive state; and a controller,
wherein the controller performs
a first operation of obtaining, before a start of radiation irradiation to the radiation imaging apparatus, (i) a signal of the signal line during a period from when the signal line is reset to when the switch element become a conductive state, as a first signal, and (ii) a signal of the signal line during a period from when the switch element become the conductive state to when the signal line is reset, as a second signal,
a second operation of obtaining, in response to the start of the radiation irradiation, (iii) a signal of the signal line during a period from when the signal line is reset to when the switch element become the conductive state, as a third signal, and (iv) a signal of the signal line during a period from when the switch element become the conductive state to when the signal line is reset, as a fourth signal, and
a third operation of calculating, based on the first signal, the second signal, the third signal, and the fourth signal, an irradiation amount of the radiation since the start of the radiation irradiation.

17. The apparatus according to claim 16, wherein the controller calculates, in the third operation, the irradiation amount of the radiation based on a first difference which is a difference between the first signal and the second signal and a second difference which is a difference between the third signal and the fourth signal.

18. The apparatus according to claim 17, wherein the controller calculates, in the third operation, the irradiation amount of the radiation based on a difference between the first difference and the second difference.

19. The apparatus according to claim 16, wherein the controller further performs
a first initialization operation of initializing each of the plurality of pixels, after the first operation and before the second operation,
a second initialization operation of initializing each of the plurality of pixels, before the first operation, and
a fourth operation of reading out image data from the plurality of pixels, after the end of the radiation irradiation in response to the irradiation amount calculated in the third operation reaching a reference value.

20. The apparatus according to claim 19, wherein an operation of reading out the image data is a first readout operation, and
the controller further performs, after the first operation and before the first initialization operation, a second readout operation of reading out image data from the plurality of pixels.

21. The apparatus according to claim 16, wherein, in a case in which at least one of a temperature in the radiation imaging apparatus, a noise amount in the radiation imaging apparatus, and a pressure to the radiation imaging apparatus has changed before the start of the radiation irradiation, the controller obtains (i) a signal of the signal line during a period from when the signal line is reset to when the switch element become the conductive state, as a new first signal, and (ii) a signal of the signal line during a period from when the switch element become the conductive state to when the signal line is reset, as a new second signal.

22. The apparatus according to claim 21, wherein the controller obtains, in the first operation, the first signal and the second signal when the at least one of the temperature in the radiation imaging apparatus, the noise amount in the radiation imaging apparatus, and the pressure to the radiation imaging apparatus has changed to a steady state.

23. The apparatus according to claim 16, wherein a plurality of modes are included as operation modes, and
the controller obtains, in the first operation, the first signal and the second signal for each of the plurality of modes.

24. The apparatus according to claim 16, wherein the plurality of pixels include a first pixel and a second pixel smaller in size than the first pixel,
the plurality of pixels are arranged so as to form a plurality of rows and a plurality of columns, and
the first pixel corresponds to a unit of one row and one column, and the unit and the second pixel correspond to a unit of one row and one column.

25. The apparatus according to claim 24, wherein the signal line is arranged along a column in which the second pixel is arranged.

26. The apparatus according to claim 24, further comprising a plurality of column signal lines corresponding to the plurality of columns and each configured to read out a pixel signal from each pixel of a corresponding column,
wherein a column signal line corresponding to the column in which the second pixel is arranged and the signal line are arranged parallel to each other.

27. The apparatus according to claim 24, wherein the controller performs, in the operation of reading out image data from the plurality of pixels, signal processing using a gain corresponding to a size ratio of the first pixel and the second pixel to a signal read out from the second pixel.

28. The apparatus according to claim 24, further comprising a power supply line configured to supply power to each of the plurality of pixels,
the power supply line being arranged between a column signal line corresponding to the column in which the second pixel is arranged and the signal line to be parallel to the column signal line and the signal line in a planar view with respect to an upper surface of a substrate arrayed with the plurality of pixels.

29. The apparatus according to claim 16, wherein
the controller performs the first operation repetitively, and
the first and second signals are calculated based on a plurality of results obtained by the repetitively performed first operations.

30. The apparatus according to claim 29, wherein the first and second signals are calculated based on at least one of an average value, a median value and a standard deviation of the plurality of results.

31. A radiation imaging system comprising:
a radiation imaging apparatus defined in claim 16; and
a processor configured to process a signal from the radiation imaging apparatus.

32. A method of driving a radiation imaging apparatus that includes a plurality of pixels, a unit which is a unit different from the pixels and includes a detecting element configured to detect radiation and a switch element corresponding to the detecting element, and a signal line configured to transmit a signal output from the detecting element in accordance with the switch element changing to a conductive state, the method comprising:
obtaining, before a start of radiation irradiation to the radiation imaging apparatus, (i) a signal of the signal line during a period from when the signal line is reset to when the switch element become a conductive state, as a first signal, and (ii) a signal of the signal line during a period from when the switch element become the conductive state to when the signal line is reset, as a second signal;
obtaining, in response to the start of the radiation irradiation, (iii) a signal of the signal line during a period from when the signal line is reset to when the switch element become the conductive state, as a third signal, and (iv) a signal of the signal line during a period from when the switch element become the conductive state to when the signal line is reset, as a fourth signal; and
calculating, based on the first signal, the second signal, the third signal, and the fourth signal, an irradiation amount of the radiation since the start of the radiation irradiation.

* * * * *